G. ENRICO.
RADIATOR FOR AUTOMOBILES.
APPLICATION FILED APR. 21, 1906.
979,137.
Patented Dec. 20, 1910.
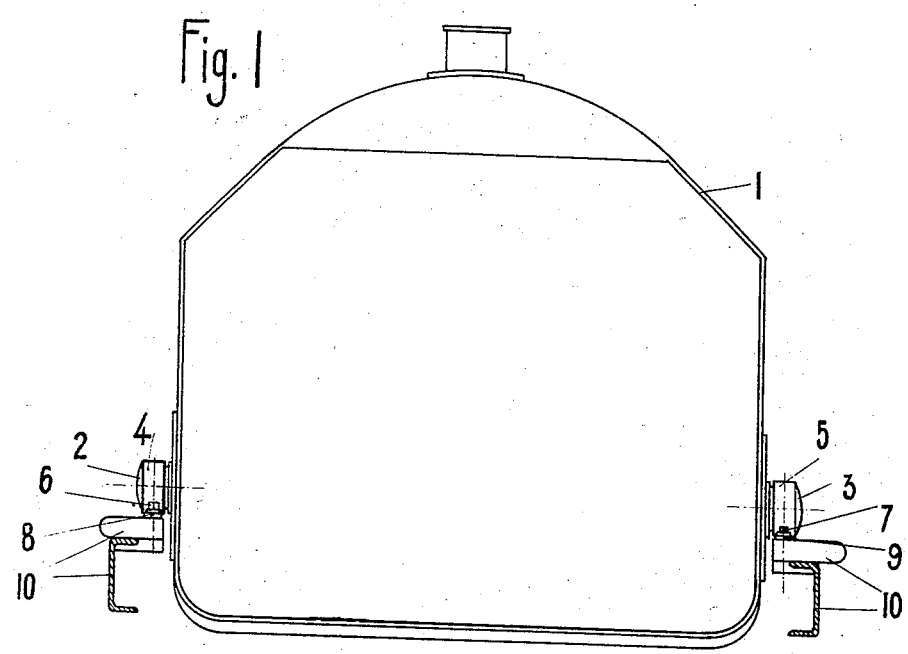
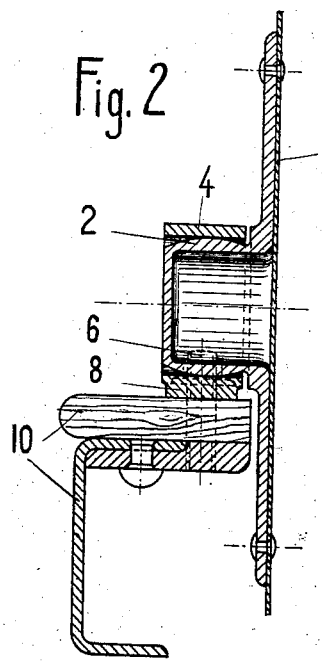
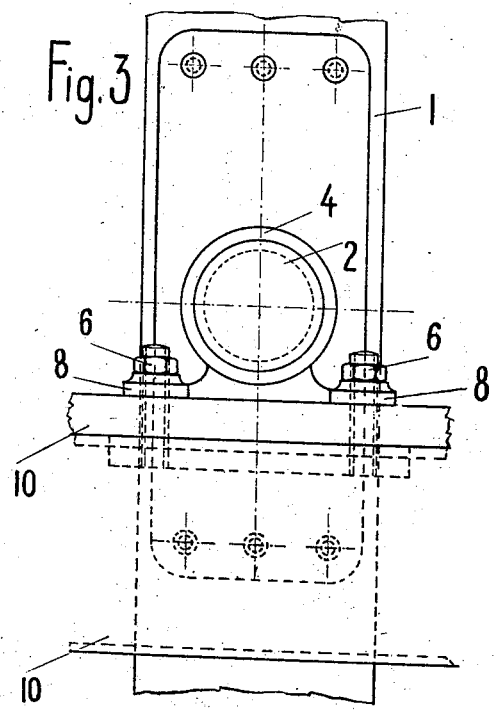
WITNESSES:
Fred White
René Bruine
INVENTOR:
Giovanni Enrico,
By his Attorneys
Arthur C. Fraser & Usina

UNITED STATES PATENT OFFICE.

GIOVANNI ENRICO, OF TURIN, ITALY, ASSIGNOR, BY MESNE ASSIGNMENTS, TO F. I. A. T., OF POUGHKEEPSIE, NEW YORK, A CORPORATION OF NEW YORK.

RADIATOR FOR AUTOMOBILES.

979,137.  Specification of Letters Patent.  Patented Dec. 20, 1910.

Application filed April 21, 1906. Serial No. 313,090.

*To all whom it may concern:*

Be it known that I, GIOVANNI ENRICO, engineer, residing at Corso Dante 35–37, Turin, Italy, a subject of the King of Italy, have invented certain new and useful Improvements in Radiators for Automobiles, of which the following is a clear and exact specification.

Radiators for automobiles are so constructed as to be easily damaged by shocks, vibrations, or distortions, and the present invention provides means for connecting them with the general frame of the vehicle so as to diminish to the largest extent the effect of shocks, vibrations or distortions of said frame upon the radiator.

The invention is illustrated in the annexed drawing wherein—

Figure 1 shows a radiator supported in accordance with the present invention and Figs. 2 and 3 show respectively a side view and a section of the bearing on an enlarged scale.

In the drawings, 1 is the frame of a radiator which is provided with two pivots 2, 3, which are preferably made hollow for diminishing their weight. Said pivots 2, 3, are mounted freely into corresponding collars 4, 5, formed with flanges 8, 9, fixed through bolts 6, 7, to the general frame of the vehicle 10. To the radiator are attached pipes—not shown in the drawings—in the usual manner and said pipes form an elastic support for maintaining the radiator in its erect position and limiting its rotation about the pivots 2, 3.

Through the described construction the oscillations and vibrations of the frame 10 are prevented from being transmitted to the radiator which is free to adapt itself to each position assumed by the frame 10 by turning about pivots 2, 3, to the required extent. In order to take up the oscillations of the vehicle also in a transverse direction, it is preferable to make the surface of the pivots 2, 3, convex as shown at Fig. 2 so that the same are allowed slightly to oscillate within their collars when necessary. Preferably the construction is such that the beams of the frame 10 can spread or move toward each other slightly without interfering with the free connection of the radiator. This construction is shown in the drawing, wherein the collars 4 are spaced apart from the bases of the pivots 2, 3, and in which such collars may move outwardly without disturbing the connection.

What I claim is:—

1. The combination of an automobile body or the like, a radiator, and means for pivoting said radiator at each of its sides to said automobile body, so that it may tilt relatively thereto, each of said means comprising two parts, one of which is movable relatively to the other in a direction transverse to said body.

2. The combination of an automobile body or the like, a radiator, and means for pivoting said radiator to the sides of said body, said means comprising collars fixed to one of said parts and pivots fixed to the other of said parts, said collars and pivots being movable relatively in a direction transverse to said body, whereby they are adapted to permit a lateral movement of said radiator in said frame.

3. The combination of an automobile body or the like, a radiator, and means for pivoting said radiator to the sides of said body, said means comprising collars fixed to one of said parts and pivots fixed to the other of said parts, said collars and pivots being adapted to permit a lateral movement of said radiator in said frame, and said pivots being formed with curved faces which engage said collars.

4. The combination of an automobile body or the like, a radiator and means for pivoting said radiator to the sides of said body comprising collars 4, 5 fixed to said body, and pivots 2, 3 fixed to said radiator, said pivots having curved faces contacting with said collars and said parts being formed to permit lateral movement of the sides of said frame toward and from each other.

5. The combination with an automobile frame and a radiator, of a radiator supporting saddle having longitudinally movable universal trunnion bearing connections with the frame.

6. The combination with an automobile frame and a radiator, of a radiator supporting saddle, having longitudinally movable, universal trunnion bearing connections with the frame, and flexible connections between the upper and lower parts of the radiator and the engine.

7. A trunnion-support for radiators comprising a supporting-bracket providing a bearing; and a trunnion journaled in said bearing so as to have universal movement therein and slide relatively thereto.

8. In combination, a radiator-frame, a support for said frame, and a universal joint connection between said frame and support.

9. In combination, a radiator-frame having a ball-trunnion projecting horizontally therefrom, and a support for said frame having a horizontally disposed bearing for coöperation with said trunnion.

In witness whereof, I have hereunto signed my name in the presence of two subscribing witnesses.

GIOVANNI ENRICO.

Witnesses.
MARIO CAPUCCIO,
GOTTARDO C. PIRONI.